United States Patent
Yarber

[15] 3,704,047
[45] Nov. 28, 1972

[54] PRESSURE REGULATING VALVE WITH FLOW CONTROL

[72] Inventor: Gordon W. Yarber, 6070 Ramirez Canyon Road, Malibu, Calif. 90265

[22] Filed: April 13, 1970

[21] Appl. No.: 27,736

[52] U.S. Cl. ............... 303/54, 251/121, 251/205, 303/10, 303/21 F, 303/40, 303/52
[51] Int. Cl. ............................................. B60t 15/04
[58] Field of Search ..................... 303/52–54, 40, 303/10; 137/625.26; 251/120, 121, 205

[56] References Cited

UNITED STATES PATENTS

| | | | |
|---|---|---|---|
| 1,144,758 | 6/1915 | Desmond | 303/54 UX |
| 3,423,136 | 1/1969 | Lohbauer | 303/54 |
| 3,485,474 | 12/1969 | Baumann | 251/121 |
| 3,515,441 | 6/1970 | Stein | 303/54 |

*Primary Examiner*—Milton Buchler
*Assistant Examiner*—John J. McLaughlin
*Attorney*—Charlton M. Lewis

[57] ABSTRACT

The invention provides more gradual and typically more linear response to an abrupt change of command force in a pressure regulating valve, in which the command force is opposed by a hydrostatic force developed from the output pressure and any lack of balance operates a control valve to supply fluid to or from the outlet to reestablish equilibrium. A flow limiting orifice is inserted between the control valve and the output, and the hydrostatic force is developed in part directly from the pressure at the output and in part from the pressure in the space between the control valve and the orifice. The effective size of the flow limiting orifice is preferably variable in response to the degree of opening of the control valve. The described structure is particularly useful in a pressure regulating valve in an antiskid brake control system.

8 Claims, 3 Drawing Figures

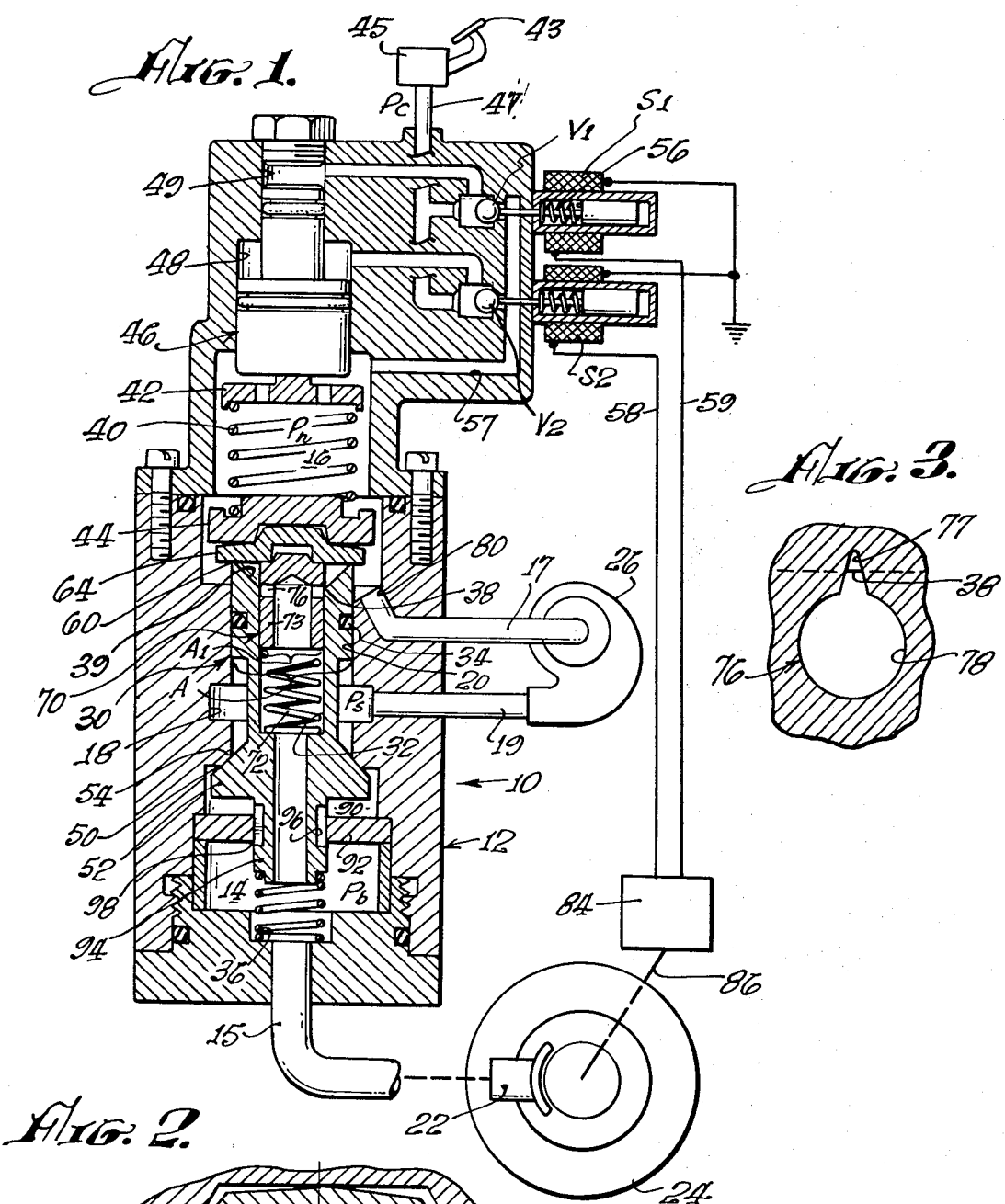

3,704,047

PRESSURE REGULATING VALVE WITH FLOW CONTROL

This invention has to do with pressure regulating valves of the type in which a valve member is movable with respect to a valve seat to maintain an output fluid pressure in equilibrium with a variable control force.

The invention is particularly useful in connection with hydraulic brake control systems which employ such pressure regulating valves for developing a commanded brake pressure, or for modulating a pressure that has been commanded. Such modulation may be employed, for example, to reduce the effective brake pressure in response to an incipient skid condition of a braked wheel to prevent actual skidding of the wheel.

The invention provides remarkably simple and economical mechanism for regulating the rate of liquid flow to or from a pressure regulating valve of the described type for controlling the output pressure. One form of the invention provides a generally constant degree of flow limitation. Another form of the invention provides a degree of flow limitation that varies sharply with the position of the valve control member.

In particular, the permitted flow rate may be caused to decrease as the valve member approaches closed position. A large portion of the pressure drop across the valve is thereby transferred from the control valve itself to the flow limiting structure, tending to smooth the action and to control any tendency of the valve to oscillate or chatter as equilibrium condition is approached. This aspect of the invention is particularly useful in connection with pressure regulating valves in which the controlled pressure can be both increased and decreased by respective valve orifices that are controlled by opposite movements of a common control member.

An important aspect of the present invention provides means for limiting the initial rate of pressure change in response to a sudden change of command force, thereby making the overall time course of pressure adjustment more nearly linear.

Such linearization of the pressure change is particularly beneficial in anti-skid brake control systems. Such systems typically include a skid sensing device for producing a skid signal in response to an incipient skid condition. Such a skid signal may change its value very rapidly, and it is desirable for the pressure regulating valve to respond promptly to such signal changes. On the other hand, an incipient skid condition is sometimes corrected by a smaller reduction of brake pressure than was initially called for. By substituting a controlled rate of pressure reduction for the conventional, substantially instantaneous dumping of brake pressure in response to a sudden skid signal, the invention permits the skid sensor to respond in those cases in which the skid is being corrected, and to countermand the skid signal before it has been fully complied with. A corresponding situation applies to abrupt increases in brake pressure called for by the anti-skid system.

The prior art includes many descriptions of brake control systems in which the present invention is useful. Illustrative of such descriptions is my U.S. Pat. No. 3,006,696, issued on Oct. 31, 1961.

A full understanding of the invention, and of its further objects and advantages, will be had from the following description of certain illustrative manners in which it may be carried out. The particulars of that description, and of the accompanying drawings which form a part of it, are intended only as illustration and not as a limitation upon the scope of the invention which is defined in the appended claims.

In the drawings:

FIG. 1 is an axial section representing an illustrative pressure regulating valve embodying the invention as typically employed in a skid control system;

FIG. 2 is a fragmentary section corresponding to a portion of FIG. 1 at enlarged scale; and FIG. 3 is a fragmentary section at enlarged scale on the line 3—3 of FIG. 2.

The illustrative pressure modulating valve shown somewhat schematically at 10 in FIG. 1 comprises the housing 12 enclosing the axially alined output chamber 14 and return chamber 16, connected by the axial bore 20. A peripheral channel intermediate the length of the bore forms the supply chamber 18. That chamber is connected via the conduit 19 to the pump 26, which supplies a suitable hydraulic liquid at an elevated supply pressure $P_s$. Return chamber 16 is connected via the conduit 17 to the suction or return inlet of pump 26, which maintains a relatively low return pressure $P_r$. The controlled output pressure $P_b$ in output chamber 14 is supplied via the conduit 15 to any desired utilization device, represented as the hydraulically actuated brake 22 for the wheel 24. The poppet member 30 is slidably mounted in bore 20 and is itself provided with an axial through bore 32. The O-ring 34 prevents leakage from supply chamber 18 upward around the poppet member. Such terms as upper and lower in the present description refer to the valve as it appears in FIG. 1, though that orientation is not necessary.

Liquid flow downward from supply chamber 18 to output chamber 14 to increase the output pressure is controlled by the inlet valve orifice 50, formed between the housing flange 54 and the peripheral flange 52 near the lower end of the poppet member. Flow from outlet chamber 14 via poppet bore 32 to return chamber 16 to lower the outlet pressure is controlled by the outlet valve orifice 60, formed between the upper and radially outer edge 62 of the poppet member and the plate 64 which serves as valve seat (FIG. 2). Each of the circular valve orifices 50 and 60 encloses essentially the same area, which will be referred to as the valve area. The poppet member is urged upward by the light spring 36, which is typically just strong enough to support the weight of the poppet member and keep valve orifice 50 closed when other forces are in equilibrium. For convenience, valve orifices 50 and 60 will generally be referred to simply as the inlet and outlet valves, respectively.

Inlet valve 50 and outlet valve 60 are jointly controlled in action by a variable control force that is applied downward on valve plate 64. That control force may be developed in any desired manner, for example by a manually driven mechanical plunger, an electrically energized solenoid, or a hydraulic actuator. The control force is typically applied to valve plate 64 via a yielding mechanism, shown as the control spring 40 with spring seats 42 and 44, which reduces the dependence of the effective force upon movement of the valve plate.

In the present illustrative structure, the control force is developed by the dual piston 46 from a control pressure $P_c$, which is supplied from a suitable source 45 via the conduit 47. Control pressure $P_c$ is supplied to one or both of the two piston chambers 48 and 49 under selective control of the pilot valves V1 and V2. Those valves are normally held by the springs 56 in the positions shown in FIG. 1, admitting control pressure $P_c$ to both piston chambers 48 and 49. Upon energization of the solenoids S1 and S2, the valve elements are shifted to the left as seen in FIG. 1, cutting off the respective piston chambers from $P_c$ and supplying them instead with return pressure $P_r$, typically obtained from return chamber 16 via the passage 57.

Energizing currents for the solenoids are supplied via the lines 58 and 59 and are developed by skid sensing and control apparatus shown schematically at 84, which receives information on the rotation of wheel 24 via the connection indicated at 86. Sensing and control apparatus 84, which may be of any desired type, develops skid signals for either one or both of the valves V1 and V2 in response to incipient skid conditions of different degrees of severity, preferably on a binary digital basis. The utilization of digital signals for that purpose and apparatus for doing so are described and claimed in my copending patent application Ser. No. 792,344, filed Jan. 21, 1969, now Pat. No. 3,545,817. The pressure regulating valve 10 produces an output pressure $P_b$ that has a normal value, in absence of a skid signal, equal to the control pressure $P_c$ multiplied by a definite factor, which may be considered the gain of valve 10. That factor is equal to the total piston area of piston chambers 48 and 49 divided by the valve area, defined above. The gain is typically unity, but may be either greater or less than unity. In presence of a skid signal on one or both of the lines 58 and 59, output pressure $P_b$ is reduced to a definite fraction of its normal value, or to return pressure $P_r$.

The structure of pressure modulating valve 10 as so far described is generally illustrative of the wide variety of conventional pressure regulating valves, and is also illustrative of the frequent use of such valves in skid control systems. Typical flow limiting structure in accordance with the present invention will now be described.

The piston element 70 is mounted in poppet bore 32, in which it is freely slidable. The piston is yieldably urged upward by the light spring 72 into continuous contact with valve plate 64, causing the piston to move axially with that plate. The contact formations between the piston and plate are preferably designed to permit at least slight angular movement to accommodate any inaccuracies of structure. The piston might alternatively be rigidly secured to plate 64, or even formed integrally with it, making spring 72 unnecessary.

The poppet bore 32 in which the piston slides terminates at its upper end in a definite edge 38, produced by intersection of the cylindrical bore wall with the outwardly flared conical wall surface 39 (FIG. 2). The cylindrical wall 71 of the piston projects above edge 38, defining with conical surface 39 and valve plate 64 the generally annular flow control chamber 80. That chamber communicates with the piston interior via orifice structure 76 in the skirt portion 73 of the piston, typically comprising a plurality of radial apertures. Apertures 76 are so positioned axially that in closed position of outlet valve 60 their outer ends are partially covered by the edge 38. The effective orifice is thereby reduced to a definite minimum size. As outlet valve 60 opens, piston 70 moves upward with valve plate 64, uncovering apertures 76 progressively with the valve movement.

Apertures 76 typically comprise conventional drilled holes of selected diameter. If that diameter is made less than the maximum travel of valve 60, all the holes are sometimes fully exposed. The effective orifice size then has a set maximum value, determined jointly by the diameter and number of the holes. The minimum effective orifice size when valve 60 is closed can be determined within a wide range by suitable axial positioning of the holes, which need not be uniform. The functional relationship between the effective orifice size and the travel of valve 60 is ordinarily not critical, but may be varied if desired within wide limits by providing holes of various selected sizes and positions, or by forming the apertures with irregular cross sections of special design.

FIG. 3 represents an illustrative aperture section, with triangular upper portion 77 and generally circular lower portion 78. The cylinder edge 38 is shown in typical position for closed condition of valve 60, exposing only a small upper section of the triangular aperture portion 77. As valve 60 opens, causing edge 38 to move downward relative to the aperture, the effective orifice size increases at first at a linearly increasing rate until edge 38 reaches the circular orifice portion 78. The orifice then increases at a much larger rate, corresponding generally to the diameter of portion 78. That diameter may be made large enough to provide relatively free flow, which may even be virtually unimpeded, if desired, once valve 60 is well open, while the relatively small aperture portion 77 provides severely limited and accurately controllable flow when valve 60 is nearly closed. A similar functional relation may be obtained, for example, by forming one or more apertures as relatively thin axial slots and others as drilled holes. Alternatively, all apertures in the piston wall may be so placed that they are fully covered when valve 60 is closed, the desired degree of communication with chamber 80 under that condition being provided in some other manner, as by designed leakage between the periphery of piston 70 and the surrounding bore wall of poppet 30.

Operation of the described flow control structure is as follows. When outlet valve 60 is closed, as under equilibrium conditions, the balance of control forces is the same as if piston 70 were not present. The upward force on valve plate 64 corresponds to output pressure $P_b$ acting directly on the area $A_1$ of piston 70 and also acting via orifice 76 and chamber 80 on the annular area $A_2$ of valve plate 64 that surrounds piston 70 (FIG. 2). The force upward on valve plate 64 is therefore $P_b A$, where A is the entire circular area $A_1 + A_2$ within valve 60.

When valve 60 opens, for example in response to an abrupt decrease in the control force exerted by spring 40, the resulting flow brings piston 70 and its orifice 76 into operation. The pressure difference between output pressure $P_b$ and return pressure $P_r$ is then no longer applied entirely across valve 60, but is divided between valve 60 and orifice 76. The ratio of that division varies with the ratio of the respective flow capacities of the valve and orifice, which varies as a predetermined function of the degree of opening of valve 60. The pressure in chamber 80 is thereby reduced from $P_b$ to a definite value $P_x$ intermediate $P_b$ and the return pressure $P_r$ in chamber 16. The upward hydrostatic force on plate 64 available to balance spring 40 is therefore reduced from $P_b A$ to $P_b A_1 + P_x A_2$. The force unbalance which initially caused valve 60 to open is thereby partially corrected even before $P_b$ has significantly decreased. That reduction of unbalance reduces the tendency for valve 60 to open wide and produce rapid initial dumping of $P_b$. Instead, fluid is released at a rate that is moderated by the flow limiting action of orifice 76.

The flow reduction just described is due only in part to direct resistance at orifice 76. Of equal or greater importance is the reduction in opening of valve 60 that results from the lowered pressure in chamber 80. The latter flow regulating action can be made relatively dominant or relatively slight according as $A_2$ is large or small compared to $A_1$. If $A_1$ and $A_2$ are equal within a factor of two or three, say, the time course of the adjustment of output pressure $P_b$ to an abrupt decrease in command force tends to be relatively linear in form, in contrast to the rapid initial decrease and rather asymptotic approach to final value that occur with conventional pressure regulating valves. At the same time, as the final equilibrium is attained, the fact that orifice 76 takes an appreciable portion of the total pressure drop tends to prevent instability at valve 60 as it finally closes. To insure such stabilizing action orifice 76 is preferably designed so that, as the valve approaches the critical condition at which chattering is most likely to occur, a major portion of the pressure drop occurs at orifice 76.

Especially if stability control is not required, many of the advantages of the invention can be obtained with a piston orifice of constant effective size, as by positioning all the apertures so they are above the edge 38 in all positions of valve 60.

FIG. 1 further illustrates structure for applying flow regulation in accordance with the invention to inlet valve 50 at the lower end of poppet element 30, which valve controls flow of pressurized fluid from supply chamber 18 to outlet chamber 14 to increase the outlet pressure $P_b$. The annular plate 92 is mounted below valve 50 in fixed relation to housing 10 and with its internal periphery in telescopically sliding relation to the cylindrical poppet extension 94. Plate 92 thus defines the auxiliary flow control chamber 90 between valve 50 and output chamber 14. Orifice structure 96 between chambers 14 and 90 is so constructed that the effective orifice 98 is small when valve 50 is closed, and increases in size progressively with opening of that valve by virtue of the downward movement of poppet 30 relative to plate 92. Such structure is shown illustratively as a plurality of axial channels 96 in the periphery of poppet extension 94 in such axial position that they extend below plate 92 only slightly in closed position of valve 50 and extend above plate 92 far enough to provide an ample orifice in all positions of the poppet. The effective orifice size is then determined essentially by the lower ends of the channels.

Operation of orifice 98 in controlling the intermediate pressure $P_y$ in chamber 90 is essentially similar to the operation already described by which orifice 76 controls pressure $P_x$ in chamber 80. With valve 50 closed, output pressure $P_b$ in chamber 14 exerts an upward force directly on the circular area $B_1$ of poppet extension 94 and indirectly via orifice 98 and chamber 90 on the annular area $B_2$ having as inner radius that of the poppet extension and as outer radius the effective radius of valve 50. When valve 50 opens, typically in response to an abrupt increase in the control force applied by spring 40, the pressure drop across orifice 98 raises the pressure in chamber 90 to a value $P_y$ intermediate $P_b$ and the much higher supply pressure $P_s$. The upward force on the poppet is thereby increased from $P_b(B_1+B_2)$ to $P_b B_1 + P_y B_2$, tending to close valve 50. The rate of flow through valve 50 is thus moderated by flow regulating action of orifice 98. That action is subject to control by design of the structure in accordance with the same principles already explained in connection with orifice 76 and valve 60.

In a bi-directional pressure regulating valve, such as that of FIG. 1, flow control of the described type may be provided in connection with either the inlet or the outlet valve or with both, according to the requirements of a particular installation. It has been found, however, that suitably designed flow control for only one of the valves is ordinarily sufficient to provide valve stability during both directions of pressure control. Apparently the tendency of a conventional pressure regulating valve to chatter results from oscillations which involve cyclic alternate opening of both inlet and outlet valves, so that damping of the flow at either valve is capable of stopping the oscillation.

In combination with a brake skid control system, as shown illustratively in FIG. 1, the flow regulating property of the described structure has the advantage of modulating the rate at which the brake pressure $P_b$ accommodates to an abrupt change of command force. The degree of that modulation is readily controllable by selection of the effective size of orifice 76 for controlling decrease of brake pressure, and of orifice 98 for controlling increase of brake pressure. It is usually desirable to provide only relatively slight modulation of the flow rate. In response to a skid signal, for example, which shifts one or both of the valves V1 and V2 in a direction to reduce the downward command force developed by piston 46 and transmitted via spring 40 to valve plate 64, it is desirable for the brake pressure to respond promptly to prevent full development of a skid. On the other hand, effective skid control does not ordinarily require instantaneous dumping of the brake pressure to zero. The present flow modulation does not delay the initiation of brake relief, but causes the brake pressure to decrease at a controlled rate. The difference in action is especially significant during the initial portion of the adjustment to an abrupt change of command force. By curbing the usual very rapid initial response, the overall pressure adjustment is made more nearly linear with time.

The degree of flow modulation is typically selected with regard to the time constants of the overal system to permit the system to respond effectively in those cases in which the incipient skid is controlled almost immediately.

A skid signal is occasionally produced as a result of some momentary or even spurious condition which is corrected without significant decrease of brake pressure. Under that condition, it is highly desirable to moderate the system response to the skid signal sufficiently to permit effective cancellation of the signal without excessive unnecessary loss of brake pressure. Accordingly, the degree of flow modulation is preferably selected with regard to the effective time constants of the system so that full adjustment of brake pressure to a skid signal requires a time longer than is needed to countermand the signal after the wheel recovers from its incipient skid conditions.

The following comments are made with particular reference to claim terminology. Whereas in the preceding description chambers 16 and 18 have been referred to for clarity as the return and supply chambers, respectively, it is noted that both chambers can properly be designated as supply chambers. Just as chamber 18 supplies the relatively high pressure $P_s$ provided by the pump outlet, chamber 16 supplies the relatively low pressure $P_r$ provided by the pump inlet. Moreover, when considering the action of valve 60 the poppet 30 may be regarded as fixed with respect to the housing. Similarly, when considering the action of valve 50 the poppet may be regarded as fixed with respect to the lower seat 44 of control spring 40. The axial sliding movement of poppet extension 94 relative to plate 92 during operation of valve 50 is analagous to the movement of piston 70 relative to poppet 30 during operation of valve 60, and it is therefore convenient to consider extension 94 as a piston structure moving in the cylindrical wall provided by plate 92. The flow control chambers 80 and 90 are both formed between their respective valves 60 and 50 and the output chamber, and include wall portions of annular form through which a force derived from fluid pressure is applied to member 64 either directly or via poppet member 30.

I claim:

1. A pressure and flow regulating valve assembly, comprising in combination
    housing structure enclosing a passage, overal
    structure forming a control valve dividing the passage, with an output chamber on one side of the valve for containing fluid under a controlled output pressure and a supply chamber on the other side of the valve for containing fluid at a supply pressure derived from a pressure source and differing always in the same direction from the controlled output pressure,
    flow control structure forming a flow control chamber interposed between the valve and the output chamber, with a flow limiting orifice of limited effective size connecting the flow control chamber and the output chamber to equalize the pressures therein when the valve is closed, flow through the valve producing a pressure difference across the orifice,
    means for controlling the output pressure comprising control means for exerting on the valve structure a variable control force tending to operate the valve in one direction, and balancing means responsive to variations in the output pressure for exerting on the valve structure a balancing force which opposes and normally balances said control force to establish an equilibrium value of the output pressure corresponding to the control force,
    the last said means comprising surface areas that are exposed to the fluid pressures in the output chamber and in the flow control chamber, respectively, said surface areas being movable in response to such pressures and being coupled to the valve structure to jointly exert thereon said balancing force,
    departure of the output pressure from such equilibrium value in a direction away from the supply pressure causing the valve to open and to reestablish equilibrium at a rate that is modulated by the flow control orifice.

2. A valve assembly as defined in claim 1, and in which
    said flow control structure includes formations defining said orifice and movable in response to valve operation to vary the effective size of the orifice.

3. A valve assembly as defined in claim 1, and in which said flow control structure includes
    structure defining an orifice of predetermined effective size when the valve is closed,
    said structure being coupled to the valve for increasing the effective size of the orifice in response to opening movement of the valve.

4. A valve assembly as defined in claim 1, and including also
    structure forming a second control valve between said output chamber and a second supply chamber for containing fluid at a supply pressure that is derived from a second pressure source that differs always in the opposite direction from the controlled output pressure,
    the second said valve forming structure being responsive to said control force and to the output pressure and acting to open the second valve in response to departure of the output pressure from said equilibrium value in a direction away from the second supply pressure.

5. In combination with a pressure regulating valve assembly that includes housing structure enclosing a passage having an axis, a poppet member axially slidable in the passage, an axially movable control member, structure forming a first valve operable in response to relative movement of the control member and the poppet member, structure forming a second valve operable in response to joint movement of the control member and the poppet member relative to the housing, structure forming an output chamber for containing fluid under a controlled output pressure and communicating with one side of each of the valves, conduit structure for supplying a supply pressure lower than the controlled pressure to the other side of the first valve and for supplying a supply pressure higher than the controlled pressure to the other side of the second valve, means for exerting a yielding axial control force on the control member in a direction tending to close the first valve and to open the second valve, and means for developing a balancing hydrostatic force corresponding to pressure derived from the output chamber for opposing the control force and normally maintaining an equilibrium value of the output pressure;
    structure forming a flow control chamber that is interposed between one of the valves and the output chamber, such structure including coaxial piston and cylinder structures that are relatively movable in response to operation of said one valve, and structure forming a flow control orifice of limited effective size connecting the flow control chamber and the output chamber, flow through said one valve producing a pressure difference across the orifice, the flow control chamber and the output chamber including respective wall portions that move axially with one of said piston and cylinder structures and with the control member at least during operation of said one valve, and develop hydrostatic forces that jointly produce said balancing force, whereby flow through said one valve causes said balancing force to vary in a direction tending to close the valve.

6. The combination defined in claim 5, and in which said one valve has a circular valve orifice with a predetermined valve radius, and the radius of said piston and cylinder structures is less than the valve radius.

7. The combination defined by claim 5, and in which said orifice forming structure includes orifice defining formations that are relatively movable in response to operation of said one valve, said formations defining a predetermined minimum orifice size when the valve is closed, and acting to increase the orifice size in response to opening movement of the valve.

8. The combination defined in claim 5, and in which said structure forming the first valve comprises mutually cooperating coaxial formations on the poppet member at one end thereof and on the control member defining a circular valve orifice having a valve radius, said orifice opening in response to axial movement of the control member away from the poppet member, said poppet member has an axial through bore with a cylindrical wall, said chamber forming structure comprises a piston slidable in the cylindrical bore and effectively coupled for axial movement with the control member, and said orifice forming structure includes an aperture in the piston that is at least partially covered by the bore wall when the valve is closed, movement of the control member away from the poppet member to open the first valve causing the aperture to be progressively less covered by the bore wall.

* * * * *